(12) United States Patent
Steinman (10) Patent No.: US 9,488,097 B2
(45) Date of Patent: Nov. 8, 2016

(54) SOLENOID VALVE

(71) Applicant: Stoneridge, Inc., Warren, OH (US)

(72) Inventor: Robert J. Steinman, Lexington, OH (US)

(73) Assignee: STONERIDGE, INC., Warren, OH (US)

( * ) Notice: Subject to any disclaimer, the term of this patent is extended or adjusted under 35 U.S.C. 154(b) by 249 days.

(21) Appl. No.: 13/737,242

(22) Filed: Jan. 9, 2013

(65) Prior Publication Data
US 2014/0020379 A1 Jan. 23, 2014

Related U.S. Application Data

(60) Provisional application No. 61/584,414, filed on Jan. 9, 2012.

(51) Int. Cl.
*F16K 31/02* (2006.01)
*F02D 23/00* (2006.01)
*F02B 37/18* (2006.01)

(52) U.S. Cl.
CPC ............ *F02B 37/186* (2013.01); *F02D 23/00* (2013.01); *F16K 31/02* (2013.01); *Y02T 10/144* (2013.01)

(58) Field of Classification Search
CPC .... F02B 37/18; F02B 37/183; F02B 37/186; F16K 31/02; F02D 23/00; Y02T 10/144
USPC ....................... 60/602; 251/129.15
See application file for complete search history.

(56) References Cited

U.S. PATENT DOCUMENTS

| | | | | |
|---|---|---|---|---|
| 3,379,214 A * | 4/1968 | Weinberg | ................... | 137/625.5 |
| 4,561,631 A | 12/1985 | Slavin et al. | | |
| 4,703,737 A * | 11/1987 | Cook et al. | ................... | 123/520 |
| 5,246,199 A * | 9/1993 | Numoto et al. | ......... | 251/129.15 |
| 5,406,975 A * | 4/1995 | Nakamichi et al. | .......... | 137/495 |
| 5,538,220 A * | 7/1996 | LaMarca | ................... | 251/129.15 |
| 6,012,289 A * | 1/2000 | Deckard et al. | ............... | 60/602 |
| 6,105,931 A * | 8/2000 | Frank et al. | ............. | 251/129.15 |
| 6,199,587 B1 * | 3/2001 | Shlomi et al. | ............. | 137/625.5 |
| 6,206,044 B1 * | 3/2001 | Gluf, Jr. | ................... | 137/625.65 |
| 7,106,158 B2 * | 9/2006 | Forsythe et al. | .............. | 335/220 |
| 2004/0182078 A1 * | 9/2004 | Tsokonas | ..................... | 60/605.1 |

(Continued)

OTHER PUBLICATIONS

International Search Report and Written Opinion mailed Mar. 13, 2013 in corresponding PCT Patent Application No. PCT/US13/20774 filed Jan. 9, 2013.

*Primary Examiner* — Thomas Denion
*Assistant Examiner* — Jessica Kebea
(74) *Attorney, Agent, or Firm* — Grossman, Tucker, Perreault & Pfleger, PLLC (57) ABSTRACT

A solenoid valve includes a housing defining an interior cavity and at least a first and second port coupled to the housing and having associated passages configured to be in fluid communication with the interior cavity. The solenoid valve further includes a valve seat disposed about an opening between the first and second ports and interior cavity. The valve seat is integrally formed with the housing, such that the housing and valve seat are a single unitary structure. The solenoid valve further includes a bobbin supporting a coil and an armature and seal movably disposed within the bobbin and relative to the coil. The armature and seal are moveable between an open position and a closed position relative to the valve seat, wherein, in the closed position, the seal sealingly engages with the valve seat.

20 Claims, 5 Drawing Sheets

(56) References Cited

U.S. PATENT DOCUMENTS

| | | |
|---|---|---|
| 2006/0064980 A1 | 3/2006 | Ivens et al. |
| 2007/0194261 A1* | 8/2007 | Kato et al. ............... 251/129.15 |
| 2008/0173839 A1 | 7/2008 | Robinson et al. |
| 2009/0120521 A1* | 5/2009 | Clark et al. .............. 137/625.64 |
| 2009/0152485 A1* | 6/2009 | Nomichi et al. ......... 251/129.01 |
| 2009/0301080 A1* | 12/2009 | Hezel et al. .................... 60/602 |
| 2010/0206388 A1 | 8/2010 | Bielab |
| 2014/0166916 A1* | 6/2014 | Buse et al. .................... 251/186 |

* cited by examiner

SOLENOID VALVE

CROSS-REFERENCE TO RELATED APPLICATIONS

The present application claims the benefit of U.S. Provisional Patent Application Ser. No. 61/584,414, filed Jan. 9, 2012 and titled SOLENOID VALVE, the entire disclosure of which is incorporated herein by reference.

FIELD

The present disclosure relates generally to solenoids, and, more particularly, to a solenoid valve for a turbocharger system.

BACKGROUND

Turbochargers may improve the performance of internal combustion engines by delivering a greater mass of air to the combustion process, relative to a naturally aspirated engine, thereby allowing a greater amount of fuel to be burned during each combustion cycle and realizing an associated power increase. A turbine wheel is driven by exhaust gasses from the combustion process, and in turn drives a compressor that compresses ambient air and delivers the compressed charge of air to the engine intake to be mixed with fuel for the combustion process.

The pressure of the compressed charge of air delivered to the engine intake must be controlled to prevent over-pressurizing the engine intake, which may lead to engine damage and/or decreased engine performance. A variety of mechanisms and arrangements are commonly used for controlling the pressure of the intake charge. For example, the engine intake may include a blow-off valve which may release excess pressure from the intake manifold. On the exhaust side of the engine, a wastegate may be employed to allow at least a portion of the exhaust gasses from the engine to bypass the turbine, thereby controlling the rotational speed of the turbine and the attendant compression of the intake charge by the compressor.

A wastegate may include a mechanical valve which may be operated based on one or more of the turbine rotational speed, intake pressure, engine performance, intake mass air flow, etc. The mechanical valve of the wastegate may be actuated by a mechanical or an electromechanical actuator. Conveniently, a pressure or a vacuum actuator may be used to control the wastegate. Such valves rely on a vacuum source or pressurized air acting against a diaphragm, e.g., working against a spring, to open and close the wastegate.

The vacuum or pressure supplied to the wastegate actuator may be controlled by, for example, a boost controller. The boost controller may include a solenoid valve, which may be controlled based on any of the foregoing parameters, to operate the wastegate to control the turbocharger boost pressure. In particular, the boost controller may be configured to control the boost level produced in the intake manifold of the engine by affecting the air pressure delivered to the wastegate. Some turbocharger systems include an electronic boost control system, wherein the solenoid valve is controlled by an electronic control unit (ECU) and the system may utilize pulse width modulation (PWM) techniques when controlling the vacuum or pressure supplied to the wastegate.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION

By way of overview, the present disclosure is generally directed to a solenoid valve for use in a turbocharger system. In particular, a solenoid valve consistent with the present disclosure is configured to operate a wastegate to control turbocharger boost pressure. More specifically, the solenoid valve is configured to control the boost level produced in an intake manifold of an engine by affecting the vacuum and/or pressure delivered to the wastegate.

The solenoid valve generally includes a housing defining an interior cavity and at least a first and second port coupled to the housing, wherein each port has an associated passage configured to be in fluid communication with the interior cavity. The solenoid valve further includes at least one valve seat disposed about an opening between the first and second ports and the interior cavity, wherein the valve seat formed by a portion of the housing. The solenoid valve further includes a bobbin supporting a coil disposed within the interior cavity of the housing and an armature having a seal coupled to a portion thereof disposed within the bobbin and relative to the coil. The armature and seal are configured to be movable between a first position and a second position relative to the valve seat.

When in the first position, the armature and seal are positioned a distance away from an opening of the valve seat and the associated passages of the first and second ports are in fluid communication with one another and the interior cavity of the housing. When in the second position, the seal sealingly engages the opening of the valve seat and the associated passages of the first and second ports are not in fluid communication with one another. Accordingly, vacuum or pressure may be supplied to a wastegate by at least one of the ports depending on the position of the armature and seal relative to the valve seat.

The solenoid valve may provide a means for boost control strategies, such as, for example, eliminating premature wastegate opening and delaying the initiating point for wastegate operation. Additionally, the valve seat is integrally formed with the housing of the solenoid valve (e.g. the valve seat and housing are formed as a single, unitary piece), thereby reducing the number of components required, resulting in a reduction of cost for the solenoid valve, as well as the number of steps required to manufacture of such a valve.

Figure 1:
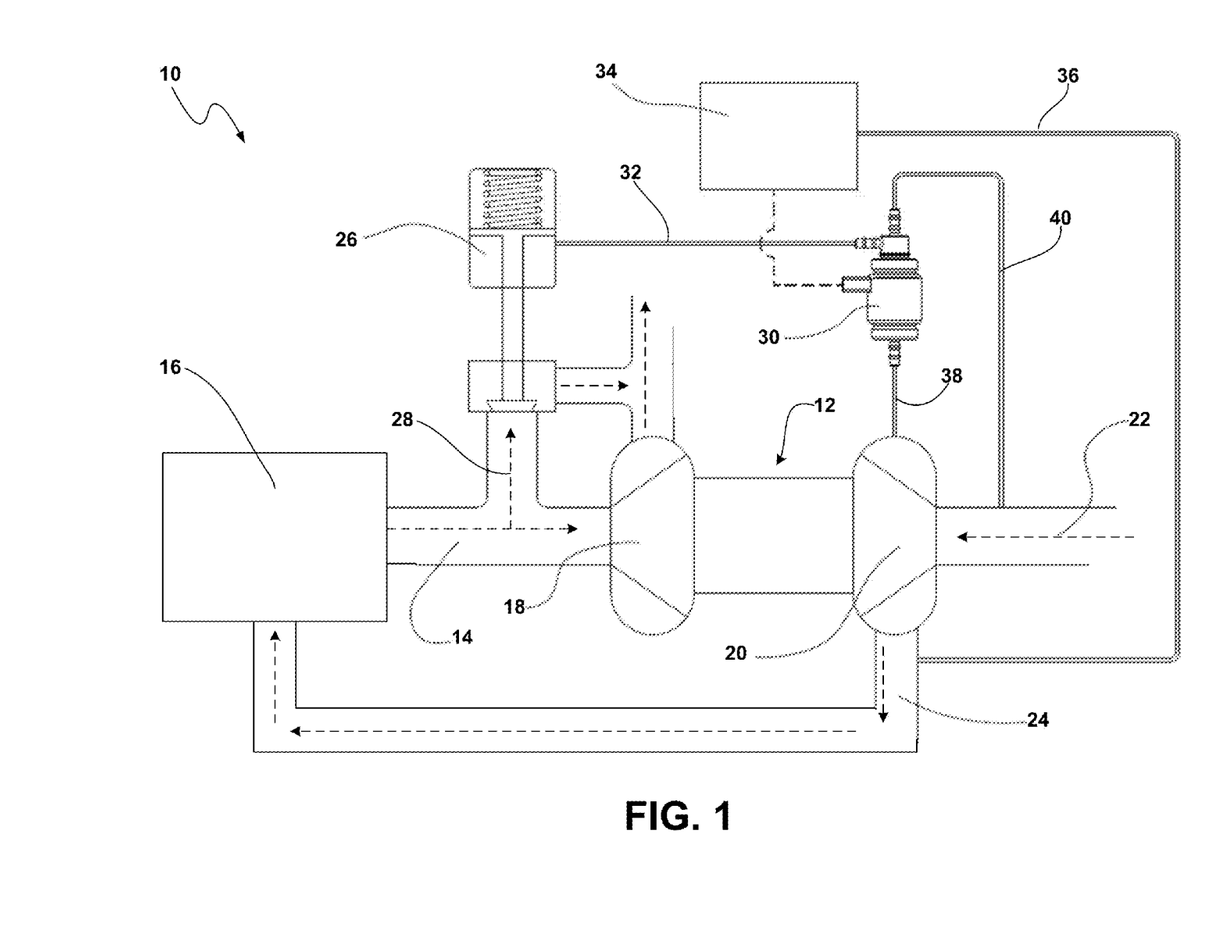
FIG. 1 is a schematic illustration of a turbocharger system including a solenoid valve consistent with the present disclosure.

FIG. 1 is a schematic illustration of a turbocharger system 10 including a solenoid valve 30 consistent with the present disclosure. Generally, a turbocharger system 10 consistent with the present disclosure may be used for gasoline and/or diesel internal combustion engines. The turbocharger system 10 may be used for pressurizing or boosting an intake air stream routed to a combustion chamber of an engine by using the heat and volumetric flow of exhaust gas exiting the engine.

In the illustrated embodiment, the turbocharger system 10 may include a turbocharger 12 configured to receive exhaust gasses, as indicated by arrow 14, from an engine 16. In particular, exhaust gas 14 exiting the engine 16 may be routed into a portion of the turbocharger 12 and may cause an exhaust-driven turbine 18 of the turbocharger 12 to rotate. As the turbine 18 rotates, a compressor 20 coupled to the turbine 18 may also rotate. The spinning action of the compressor 20 may cause ambient intake air, as indicated by arrow 22, to enter the turbocharger 12 by way of the compressor 20. The compressor 20 may be configured to compress the ambient air 22 and deliver a compressed charge of air, as indicated by arrow 24, to an intake of the engine 16 to be mixed with fuel for the combustion process.

The turbocharger system 10 may further include a wastegate 26. The amount by which the intake air 22 is boosted or pressurized by the turbocharger 12 may be controlled by regulating the amount of exhaust gas 14 that is passed through the turbocharger 12 by diverting a portion of the exhaust through the wastegate 26. In particular, the wastegate 26 may be configured to allow at least a portion of the exhaust gasses 14 from the engine 16 to bypass the turbine 18 of the turbocharger 12, thereby controlling the rotational speed of the turbine 18 and compressor 20 and the attendant compression of the intake air 22 by the compressor 20. As generally understood by one skilled in the art, the wastegate 26 may include a mechanical valve which may be operated based on one or more of the rotational speed of the turbine 18, intake pressure, engine performance, intake mass air flow, etc.

The wastegate 26 may be opened during operation of the turbocharger 12 when the boost pressure is approaching a maximum desired pressure. The wastegate 26 may be configured to divert an amount of exhaust gas around the turbocharger turbine 18, as indicated by arrow 28, to reduce the rotational speed of the turbine 18, thereby reducing the rotational speed of the air compressor 20, and thus the amount by which the intake air 22 is pressurized. The mechanical valve of the wastegate 26 may be actuated by a mechanical or an electromechanical actuator. As generally understood, such valves may rely on a vacuum source or pressurized air acting against a diaphragm, e.g., working against a spring, to open and close the wastegate 26.

The turbocharger system 10 may further include a boost controller 30 configured to control the wastegate 26. In the illustrated embodiments described in greater detail herein, the boost controller 30 may include a solenoid valve (hereinafter referred to as "solenoid valve 30"). In particular, the solenoid valve 30 may be configured to vary the vacuum or pressure supplied, via a connection line 32, to the wastegate actuator 26 which, in turn, may vary the position of the wastegate 26 and thus the amount of exhaust 28 diverted around the turbine 18, resulting in a change in turbine 18 and compressor 20 rotational speed and resulting boost pressure.

As shown, the solenoid valve 30 may be coupled to an electronic control unit (ECU) 34. In particular, the solenoid valve 30 may be configured to receive one or more signals from the ECU 34 and, in turn, operate in accordance with such received signals. More specifically, the ECU 34 may be configured to control operation of the solenoid valve 30 based on a variety of operational parameters of the turbocharger system 10, including, but not limited to, turbine rotational speed, intake pressure, engine performance, intake mass air flow, etc. For example, in the illustrated embodiment, the ECU 34 may be configured to determine the pressure of the compressed charge of air 24 from the compressor 20 via a connection line 36, and may control operation of the solenoid valve 30 based on the pressure of the compressed charge of air 24. The ECU 34 may utilize any known pulse width modulation (PWM) techniques when communicating with and controlling the solenoid valve 30.

Figure 2:
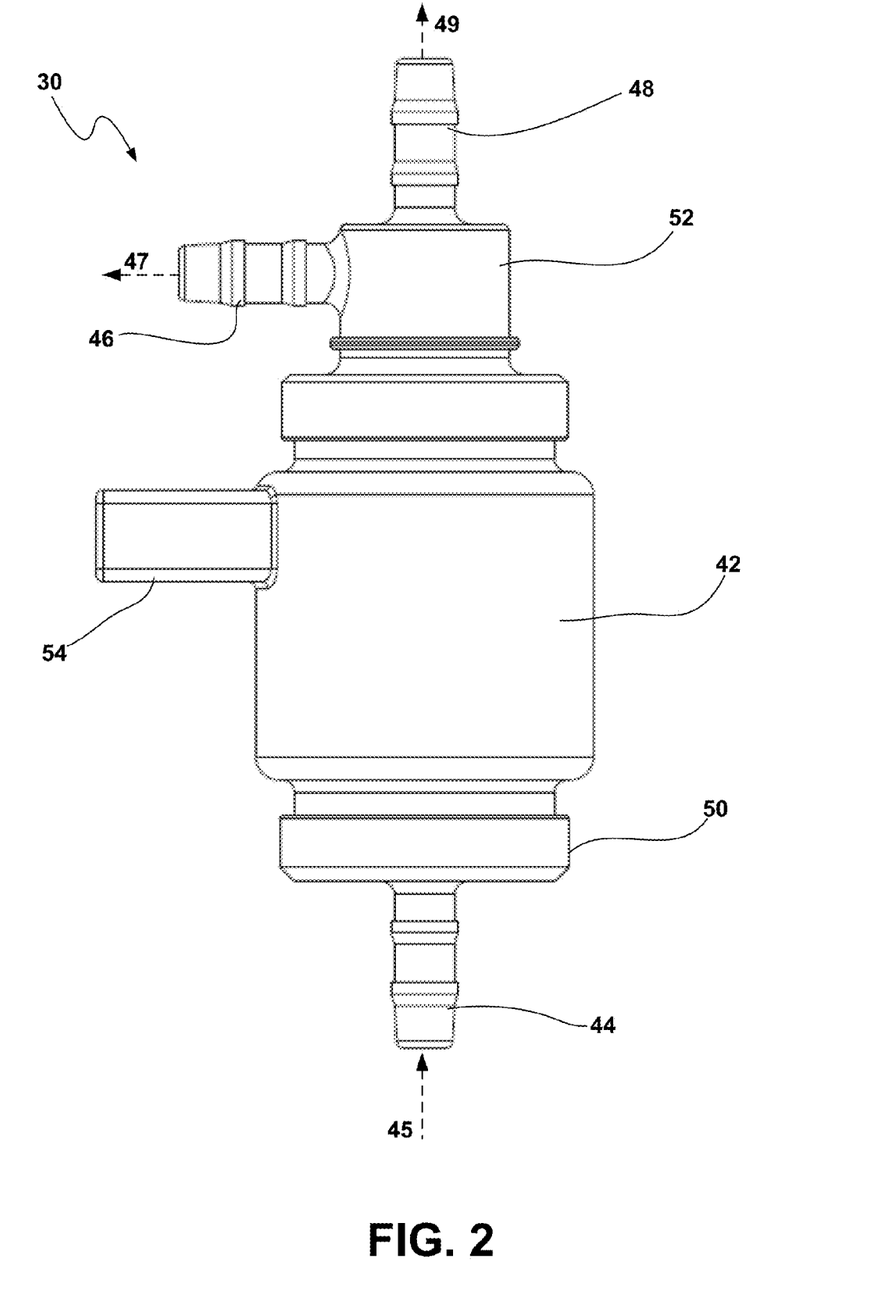
FIG. 2 is a side view of one embodiment of a solenoid valve consistent with the present disclosure.

Turning now to FIG. 2, a side view of one embodiment of a solenoid valve 30 consistent with the present disclosure is illustrated. Generally, the solenoid valve 30 may include a housing 42 defining an interior cavity 43 (shown in FIGS. 3-5) and a plurality of ports extending therefrom, for example, ports 44, 46, 48. In the illustrated embodiment, port 44 may be provided by a first valve body 50 coupled to a portion of the solenoid housing 42 and ports 46 and 48 may be provided by a second valve body 52 coupled to a portion of the solenoid housing 42. The ports 44-48 may be configured to be in fluid communication with the interior cavity 43 of the housing 42.

The solenoid valve 30 may further include an electrical connector 54 for providing a means of communication between the ECU 34 and the solenoid valve 30, as well as providing power to the solenoid valve 30. The electrical connector 54 may include one or more terminals (shown in FIGS. 3 and 4) for receiving a control signal from the ECU 34.

As described in greater detail herein, the ports 44-48 are configured to be in fluid communication with the interior cavity 43 of the housing 42, and, in turn, may be in fluid communication with one another depending on operation of the solenoid valve 30. The ports 44-48 may variously be connected to a vacuum source, a vacuum actuator, such as the wastegate 26, a pressure source, etc. The control signal received via the electrical connector 54 may open or close the various ports 44-48. For example, in the illustrated embodiment, a first port, e.g. 44, may be configured to receive ambient intake air, as indicated by arrow 45, via a connection 38 (shown in FIG. 1), and a second port, e.g. port 46, may be connected to the wastegate 26 via a connection 32 (shown in FIG. 1) and may be configured to vary the vacuum and/or pressure, as indicated by arrow 47, supplied to the wastegate 26. Additionally, a third port, e.g. port 48, may be configured to allow air to flow out of the solenoid valve 30, as indicated by arrow 49, and back into the intake air supply 22 via a connection 40 (shown in FIG. 1). The solenoid valve 30 may be actuated to open the second port 46 relative to the first port 44 so as to apply vacuum and/or pressure to the wastegate actuator, thereby opening and/or closing the wastegate 26. Other arrangements of vacuum ports, actuators, etc., may suitably be employed in connection with the present disclosure.

The solenoid housing 42 may include a polymer material. In particular, the housing 42 may be a molded plastic component, e.g., molded from glass reinforced nylon. The polymeric material may include reinforcing materials and fillers, such as glass fiber, to increase the strength of the housing 42. Similarly, the ports 44, 46, 48 and associated the first and second valve bodies 50, 52 may include polymer materials.

Figure 3:
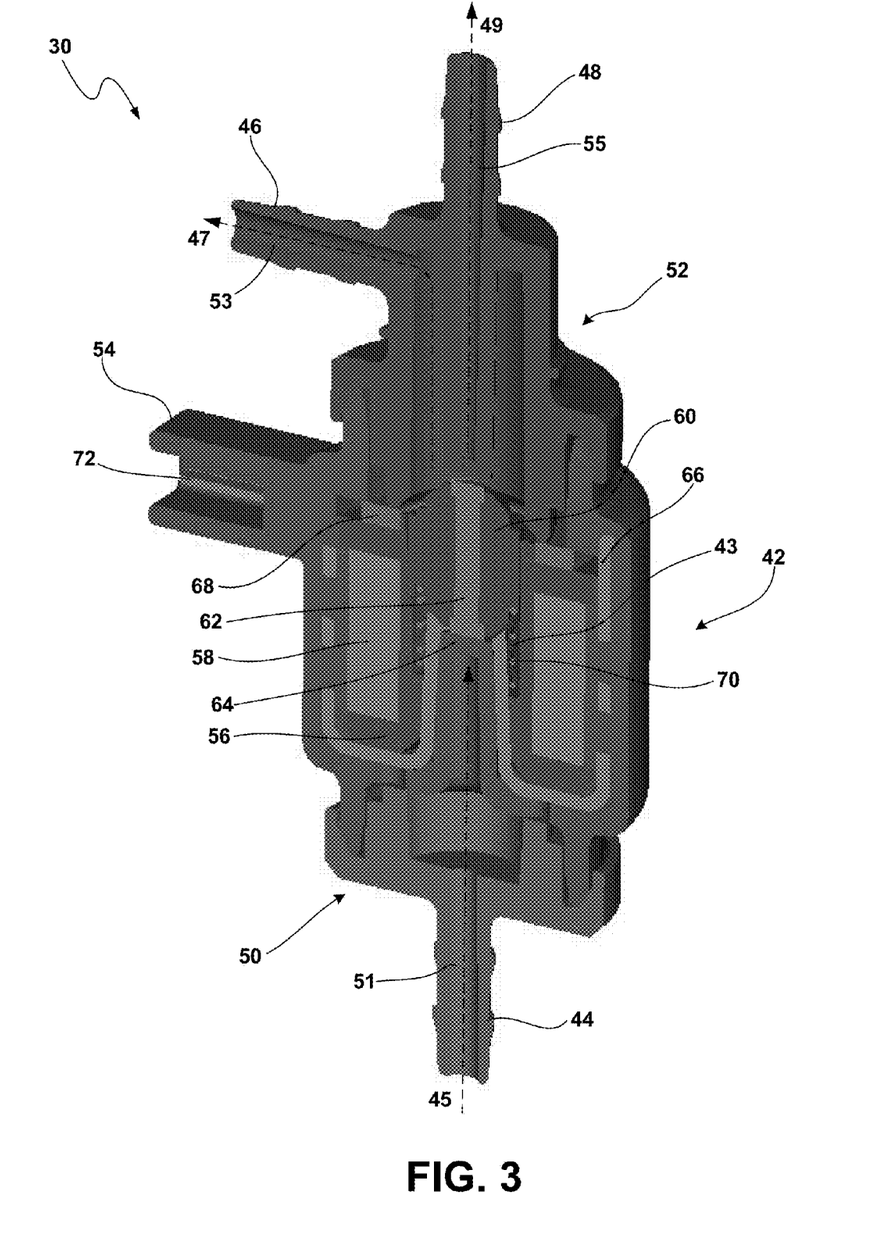
FIG. 3 is a perspective view, partly in section, of the solenoid valve of FIG. 2.
Figure 4:
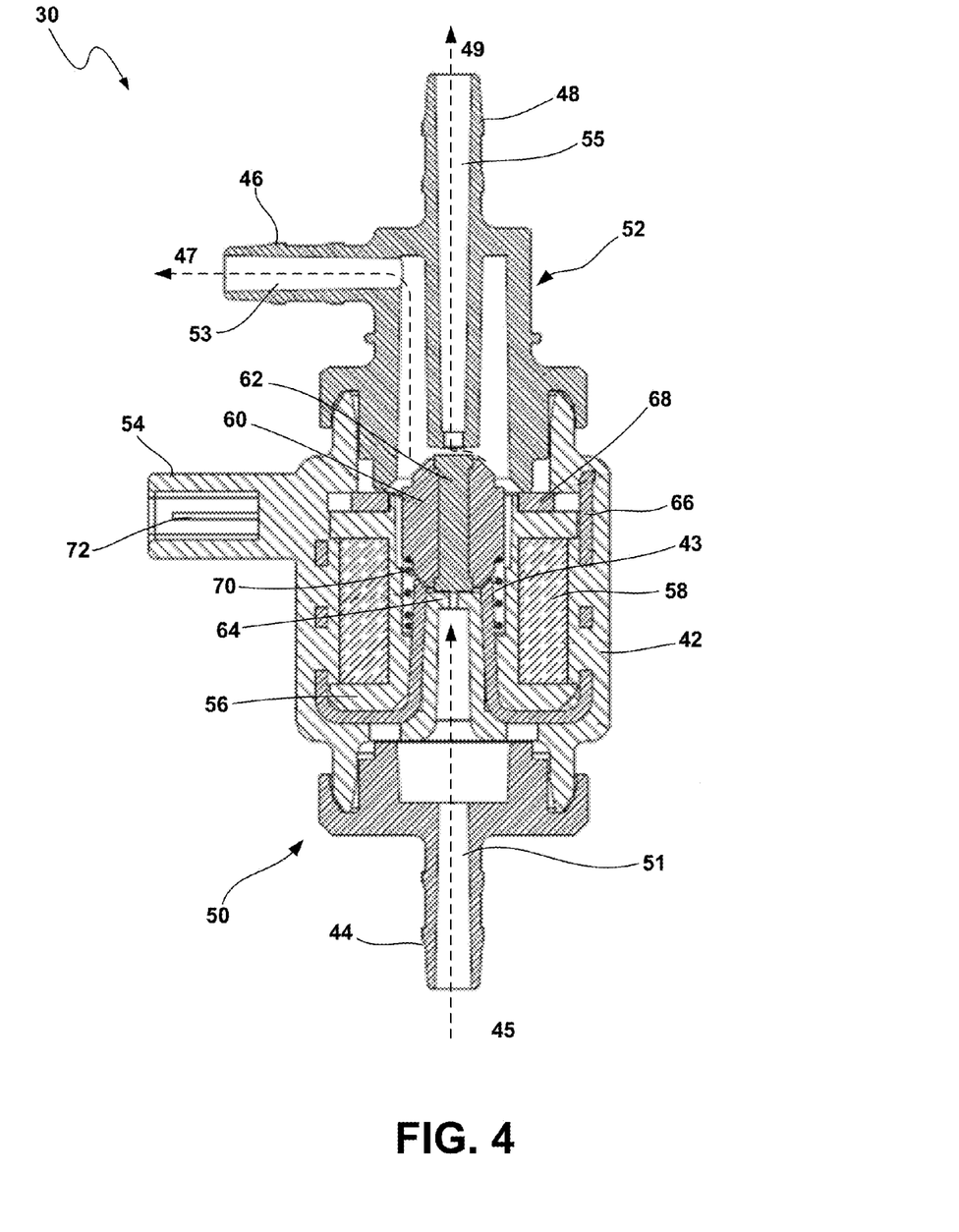
FIG. 4 is a cross-sectional view of the solenoid valve of FIG. 2 in an energized state.
Figure 5A:
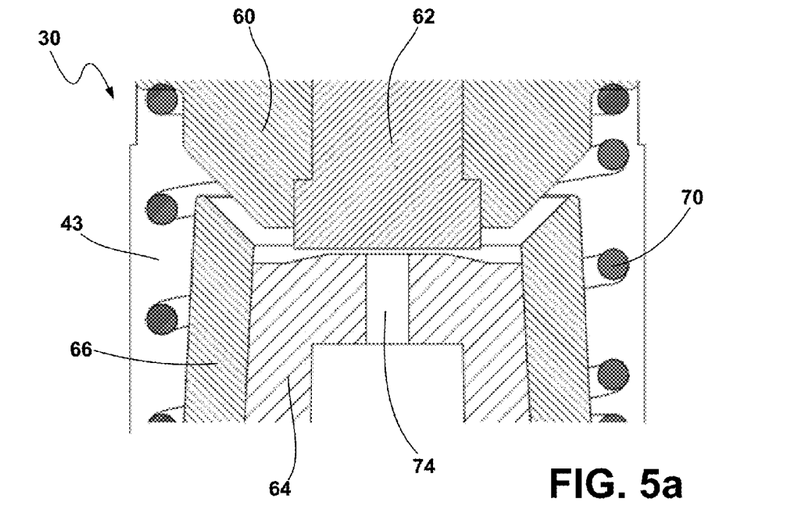
FIGS. 5a and 5b are enlarged views of a portion of the solenoid valve.
Figure 5B:
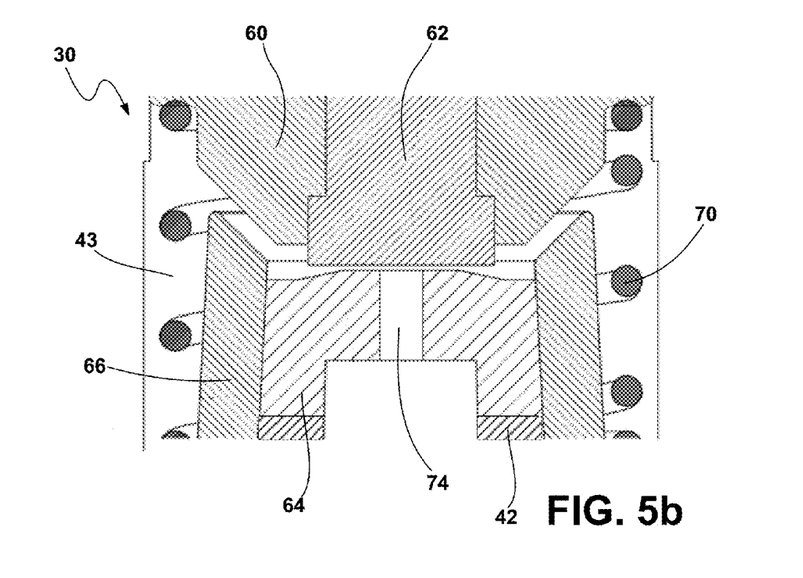

With additional reference to FIGS. 3-4, more detailed views of the solenoid valve 30 are shown. In particular, FIGS. 3 and 4 are perspective, partly in section, and cross-sectional views, respectively, of the solenoid valve of FIG. 2. FIGS. 5a and 5b are enlarged views of a portion of the solenoid valve. As shown, the solenoid valve 30 may include a bobbin 56 configured to support a solenoid coil 58. The solenoid valve 30 further includes an armature 60 slidably disposed at least partially within the bobbin 56. For example, the armature 60 may be slidably disposed along the axis of the bobbin 56. An armature seal 62 is coupled to at least a portion of the armature 60 to permit the armature 60 and the seal 62 to move together in at least one direction. The armature 60 and seal 62 may be moveable relative to a valve seat 64 formed by the housing 42 and disposed about an opening between the first port 44 and the second and third ports 46, 48.

Movement of the seal 62 to sealingly engage the valve seat 64 may close an opening 74 (shown in FIG. 5) of the valve seat 64, and thereby close the solenoid valve 30 to fluid communication between an associated passage 51 of the first port 44 and associated passages 53, 55 of the second and third ports 46, 48, respectively. Correspondingly, movement of the seal 62 out of sealing engagement with the valve seat 64 (movement of the armature 60 and seal 62 in a direction away from the valve seat 64) may open the opening 74 of the valve seat 64, thereby opening the solenoid valve 30 and allow fluid communication between at least the associated passage 51 of the first port 44 and the associated passage 53 of the second port 46.

The seal 62 may be constructed from a polymer material or the like. The seal 62 may also be constructed from a generally metallic material such as, but not limited to, steel, brass, iron, or the like. The armature 60 may be constructed from a generally metallic material such as, but not limited to, steel, brass, iron, or the like. Additionally, the armature 60 may be constructed from a material exhibiting magnetic properties, such as, for example, a ferrous material.

As shown, the bobbin 56, coil 58, armature 60, and armature seal 62 may be retained within the interior cavity 43 of the housing 42 by a retaining bracket 66. The retaining bracket 66 may further include a base plate 68 disposed along a portion of the bobbin 56. In particular, retaining bracket 66 and base plate 68 may include a material exhibiting generally magnetic properties, including a ferrous material. As such, a complete magnetic circuit may be formed when the solenoid valve 30 is energized (i.e. the seal 62 is in sealing engagement with the valve seat 64). In particular, in an energized state, a portion of the armature 60 may contact a portion of the bracket 66, thereby completing a magnetic circuit.

The solenoid valve 30 may further include a return spring 70 configured to bias the armature 60 and seal 62 toward an open position (i.e. a position in which the seal 62 is not sealingly engaged with the seat 64). For example, the return spring 70 may be disposed within a portion of the bobbin 56 and may bear against a portion of the armature 60. When the coil 58 is not energized, the return spring 70 may bias the armature 60, and, in turn, the seal 62, toward a first position, i.e., an open position in which the armature 60 and seal 62 are positioned toward the end of the bobbin 56 away from the valve seat 64. When the coil 58 is energized, the magnetic field induced in the retaining bracket 66 and base plate 68 may urge the armature 60 and seal 62 against the bias of the return spring 70 and toward a second, closed, position in which the armature 60 is positioned toward the seat 64, by comparison to the first position. The seal 62 may be urged into sealing engagement with the seat 64 in the second position.

As previously described, the solenoid housing 42 includes an electrical connector 54 for at least providing power to the solenoid valve 30, particularly the coil 58. As shown, the connector 54 may be provided as an integral feature of the solenoid housing 42. In other embodiments, power to the coil 58 may be provided through hardwired electrical connection, pigtail connectors, etc. The electrical connector 54 may include one or more terminals 72 for receiving a control signal from the ECU 34.

As previously described, the ECU 34 may control the solenoid valve 30, specifically control the position of the armature 60 and seal 62 with respect to the valve seat 64. In particular, in response to a signal received from the ECU 34, the coil 58 may be energized, thereby causing the armature 60 and seal 62 to move within the bobbin 56 towards the valve seat 64. The movement of the armature 60 and seal 62 in relation to the valve seat 64 may be varied by a dutycycle from 0% through 100% applied to the coil 58 to create a change in pressure 47 (i.e. created by the amount of intake air 45 allowed to flow from the first port 44 to the second port 46) supplied by the second port 46 to the wastegate 26. Correspondingly, in response to another signal received from the ECU 34, the armature 60 and seal 62 may move to other positions within the bobbin 56 relative to the valve seat 64 to provide desired pressure or vacuum to the wastegate 26.

For example, in order to completely close the solenoid valve 30 (i.e. prevent fluid communication between the first port 44 and the second and third ports 46, 48) a signal received from the ECU 34 may cause the coil 58 to energize and, in turn, cause the armature 60 and seal 62 to move in a direction towards the valve seat 64 and engage and completely close the opening 74 of the valve seat 64, thereby preventing fluid communication between the passage 51 of the first port 44 and the passages 53, 55 of the second and third ports 46, 48, respectively. Other signals may be received from the ECU 34, wherein the armature 60 and seal 62 may move in a direction away from the valve seat 64 so as to allow fluid communication between the passage 51 of the first port 44 and at least one of the passages 53, 55 of the second and third ports 46, 48, respectively, In some currently known solenoid valve configurations, a core component may be included and may generally include the valve seat. As shown in at least FIGS. 3 and 4, the valve seat 64 of the solenoid valve 30 is integrally formed with the solenoid housing 42. More specifically, the valve seat 64 is formed by a portion of the solenoid housing 42 resulting in a single unitary structure. Accordingly, a solenoid valve consistent with the present disclosure is devoid of a core component.

In one embodiment, the valve seat 64, FIG. 5a, may be constructed from the same material as the solenoid housing 42. More specifically, the valve seat 64 may include a polymer material, such as, for example, a glass reinforced nylon. In other embodiments, the valve seat 64, FIG. 5b, may include other materials, separate from the solenoid housing 42 materials. The housing 42 and valve seat 64 may be integrally formed with one another by any known means generally understood by one skilled in the art. For example, the housing 42 and valve seat 64 may be formed by injection molding processes.

The integral formation of the valve seat 64 with the solenoid housing 42 may be advantageous in that a solenoid valve consistent with the present disclosure has reduced number of components (i.e. no core component required). This reduction in number of components may result in reduced production costs (e.g. less steps required for manufacture). Additionally, the integration of the valve seat 64 with the solenoid housing 42 allows a greater customization and flexibility with respect to manufacturing the inside diameter of the valve seat. For example, different inside diameters may be required based on a particular application of use. As such, rather than supplying a large number of different core components (with different inside diameters) for each application, a solenoid valve consistent with the present disclosure allows customization of the inside diameter of the valve seat by changing the pin size on a production mold, thereby reducing the number of components necessary for a range of manufactured solenoid valves.

As generally understood, a solenoid valve consistent with the present disclosure may be configured to operate a wastegate actuator to control turbocharger boost pressure. In particular, the solenoid valve may be configured to control the boost level produced in the intake manifold of the engine by affecting the vacuum and/or pressure delivered to the wastegate. The solenoid valve may provide a means for boost control strategies, such as, for example, eliminating premature wastegate opening and delaying the initiating point for wastegate operation.

Additionally, a solenoid valve consistent with the present disclosure may include a valve seat formed integrally with a housing of the solenoid valve, thereby reducing the number of components required, resulting in a reduction of cost for the solenoid valve, as well as the number of steps required to manufacture of such a valve.

Consistent with one embodiment of the present disclosure, there is provided a solenoid valve. The solenoid valve includes a housing defining an interior cavity and at least a first and second port coupled to the housing, each port having an associated passage configured to be in fluid communication with the interior cavity of the housing. The solenoid valve further includes at least one valve seat disposed about an opening between the first and second ports and the interior cavity. The at least one valve seat formed by a portion of the housing. The solenoid valve further includes a bobbin disposed within the interior cavity of the housing, the bobbin supporting a coil. The solenoid valve further includes an armature having a seal coupled to a portion thereof and disposed within the bobbin and relative to the coil, the armature and seal movable between at least a first position away from an opening of the valve seat and a second position sealingly engaged with the opening of the valve seat.

Consistent with another embodiment of the present disclosure, there is provided a system. The system includes a wastegate and a solenoid valve coupled to the wastegate and configured to provide vacuum or pressure to an actuator of the wastegate to control operation of the wastegate. The solenoid valve includes a housing defining an interior cavity and at least a first and second port coupled to the housing, each port having an associated passage configured to be in fluid communication with the interior cavity of the housing. The solenoid valve further includes at least one valve seat disposed about an opening between the first and second ports and the interior cavity. The at least one valve seat formed by a portion of the housing. The solenoid valve further includes a bobbin disposed within the interior cavity of the housing, the bobbin supporting a coil. The solenoid valve further includes an armature having a seal coupled to a portion thereof and disposed within the bobbin and relative to the coil, the armature and seal movable between at least a first position away from an opening of the valve seat and a second position sealingly engaged with the opening of the valve seat.

Consistent with yet another embodiment of the present disclosure, there is provided a system. The system includes a turbocharger, a wastegate coupled to the turbocharger and configured to regulate maximum boost pressure output by the turbocharger and a solenoid valve coupled to the wastegate and configured to provide vacuum or pressure to an actuator of the wastegate to control operation of the wastegate.

The solenoid valve includes a housing defining an interior cavity and at least a first and second port coupled to the housing, each port having an associated passage configured to be in fluid communication with the interior cavity of the housing. The solenoid valve further includes at least one valve seat disposed about an opening between the first and second ports and the interior cavity. The at least one valve seat formed by a portion of the housing. The solenoid valve further includes a bobbin disposed within the interior cavity of the housing, the bobbin supporting a coil. The solenoid valve further includes an armature having a seal coupled to a portion thereof and disposed within the bobbin and relative to the coil, the armature and seal movable between at least a first position away from an opening of the valve seat and a second position sealingly engaged with the opening of the valve seat.

The system further includes an electrical control unit (ECU) configured to control movement of the armature and seal relative to the valve seat based on one or more operational parameters of the turbocharger.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A solenoid valve comprising:
a housing defining an interior cavity and at least one valve seat;
a first valve body configured to be secured to said housing, said first valve body comprising a first port;
a second valve body configured to be secured to said housing, said second valve body comprising at least a second port, wherein said first and said second port each include an associated passage configured to be in fluid communication with said interior cavity of said housing through said at least one valve seat;
a bobbin disposed within said interior cavity of said housing, said bobbin supporting a coil;
an armature having a seal coupled to a portion thereof and disposed within said bobbin and relative to said coil, said armature and seal configured to move from a first position, unsealed with an opening of said valve seat, to a second position sealingly engaged with said opening of said valve seat when said coil is energized; and
a bracket configured to retain said bobbin, said coil, said armature, and said armature seal within said internal cavity of said housing, wherein said bracket is further configured to complete a magnetic circuit and contact said armature only when said solenoid valve is energized.

2. The solenoid valve of claim 1, wherein:
when in said first position, said associated passages of said first and second ports are in fluid communication with one another and said interior cavity of said housing; and
when in said second position, said associated passages of said first and second ports are not in fluid communication with one another.

3. The solenoid valve of claim 1, further comprising an electrical connector configured to receive signals from an electrical control unit (ECU), wherein at least one of said signals energizes said coil and causes said armature and seal to move to said second position.

4. The solenoid valve of claim 1, wherein said housing and said at least one valve seat are a unitary structure.

5. The solenoid valve of claim 1, wherein said housing and said at least one valve seat comprise the same material.

6. The solenoid valve of claim 5, wherein said housing and said at least one valve seat comprise a polymeric material.

7. The solenoid valve of claim 1, wherein said housing and said at least one valve seat comprises different materials.

8. A system comprising:
a wastegate; and
a solenoid valve coupled to said wastegate and configured to provide vacuum or pressure to an actuator of said wastegate to control operation of said wastegate, said solenoid valve comprising:
a housing defining an interior cavity and at least one valve seat;
a first valve body configured to be secured to said housing, said first valve body comprising a first port;
a second valve body configured to be secured to said housing, said second valve body comprising at least a second port, wherein said first and said second port each include an associated passage configured to be in fluid communication with said interior cavity of said housing through said at least one valve seat;
a bobbin disposed within said interior cavity of said housing, said bobbin supporting a coil;
an armature having a seal coupled to a portion thereof and disposed within said bobbin and relative to said coil, said armature and seal configured to move from a first position, unsealed with an opening of said valve seat, to a second position sealingly engaged with said opening of said valve seat when said coil is energized; and
a bracket configured to retain said bobbin, said coil, said armature, and said armature seal within said internal cavity of said housing, wherein said bracket is further configured to complete a magnetic circuit and contact said armature only when said solenoid valve is energized.

9. The system of claim 8, wherein:
when in said first position, said associated passages of said first and second ports are in fluid communication with one another and said interior cavity of said housing; and
when in said second position, said associated passages of said first and second ports are not in fluid communication with one another.

10. The system of claim 8, wherein one of said first and second ports is coupled to said wastegate and configured to provide vacuum or pressure to said actuator of said wastegate based on said position of said armature and seal relative to said at least one valve seat.

11. The system of claim 10, wherein said wastegate is coupled to a turbocharger and configured to regulate maximum boost pressure output by said turbocharger based on vacuum or pressure received from said solenoid valve.

12. The system of claim 8, further comprising an electrical control unit (ECU) configured to cause said coil to be energized and to cause said armature and said seal to move to said second position.

13. The system of claim 8, wherein said housing and said at least one valve seat are a unitary structure.

14. The solenoid valve of claim 1, wherein said bracket is further configured to complete said magnetic circuit only when said armature seal is in sealing engagement with said valve seat.

15. The solenoid valve of claim 1, wherein said bracket is at least partially disposed about a perimeter of said valve seat.

16. The solenoid valve of claim 15, wherein said bracket extends above an opening in said valve seat.

17. The solenoid valve of claim 15, wherein said bracket at least partially surrounds said valve seat.

18. A system comprising:
a turbocharger;
a wastegate coupled to said turbocharger and configured to regulate maximum boost pressure output by said turbocharger;
a solenoid valve coupled to said wastegate and configured to provide vacuum or pressure to an actuator of said wastegate to control operation of said wastegate, said solenoid valve comprising:
a housing defining an interior cavity and at least one valve seat;
a first valve body configured to be secured to said housing, said first valve body comprising a first port;
a second valve body configured to be secured to said housing, said second valve body comprising at least a second port, wherein said first and said second port each include an associated passage configured to be in fluid communication with said interior cavity of said housing through said at least one valve seat;

a bobbin disposed within said interior cavity of said housing, said bobbin supporting a coil;

an armature having a seal coupled to a portion thereof and disposed within said bobbin and relative to said coil, said armature and seal configured to move from a first position, unsealed with an opening of said valve seat, to a second position sealingly engaged with said opening of said valve seat when said coil is energized; and a bracket configured to retain said bobbin, said coil, said armature, and said armature seal within said internal cavity of said housing, wherein said bracket is further configured to complete a magnetic circuit and contact said armature only when said solenoid valve is energized; and an electrical control unit (ECU) configured to control movement of said armature and seal relative to said valve seat based on one or more operational parameters of said system.

19. The system of claim 18, wherein:

when in said first position, said associated passages of said first and second ports are in fluid communication with one another and said interior cavity of said housing; and when in said second position, said associated passages of said first and second ports are not in fluid communication with one another.

20. The system of claim 18, wherein said housing and said at least one valve seat are a unitary structure.

* * * * *